United States Patent
Han et al.

(10) Patent No.: US 12,523,912 B2
(45) Date of Patent: Jan. 13, 2026

(54) LIGHT ROUTE CONTROL MEMBER AND DISPLAY DEVICE COMPRISING SAME

(71) Applicant: LG INNOTEK CO., LTD., Seoul (KR)

(72) Inventors: Young Ju Han, Seoul (KR); In Hae Lee, Seoul (KR); Byung Sook Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 633 days.

(21) Appl. No.: 17/758,858

(22) PCT Filed: Jan. 12, 2021

(86) PCT No.: PCT/KR2021/000377
§ 371 (c)(1),
(2) Date: Jul. 14, 2022

(87) PCT Pub. No.: WO2021/145638
PCT Pub. Date: Jul. 22, 2021

(65) Prior Publication Data
US 2023/0045017 A1    Feb. 9, 2023

(30) Foreign Application Priority Data

Jan. 14, 2020  (KR) .................. 10-2020-0004838
Jan. 21, 2020  (KR) .................. 10-2020-0007802

(51) Int. Cl.
*G02F 1/137*    (2006.01)
*G02F 1/1676*   (2019.01)

(52) U.S. Cl.
CPC ............ *G02F 1/137* (2013.01); *G02F 1/1676* (2019.01)

(58) Field of Classification Search
CPC ............... G02F 1/16762; G02F 1/1676; G02F 1/13712; G02F 1/137
See application file for complete search history.

(56) References Cited

U.S. PATENT DOCUMENTS

| 7,535,525 B2 | 5/2009 | Song et al. |
| 8,213,082 B2 | 7/2012 | Gaides et al. |

(Continued)

FOREIGN PATENT DOCUMENTS

| CN | 101903809 A | 12/2010 |
| JP | 2007-57724 A | 3/2007 |

(Continued)

OTHER PUBLICATIONS

Office Action dated Jul. 4, 2023 in Japanese Application No. 2022-542277.

(Continued)

*Primary Examiner* — Sharrief I Broome
*Assistant Examiner* — Journey F Sumlar
(74) *Attorney, Agent, or Firm* — Saliwanchik, Lloyd & Eisenschenk

(57) ABSTRACT

A light path control member according to an embodiment comprises: a first substrate; a first electrode disposed on the first substrate; a second substrate disposed on the first substrate; a second electrode disposed below the second substrate; and a light conversion unit disposed between the first electrode and the second electrode, wherein the light conversion unit includes a partition wall and an accommodation part that are arranged alternately, the accommodation part changes in light transmittance according to the application of voltage, the accommodation part includes a dispersion liquid and light conversion particles dispersed in the dispersion liquid, the contact surface between the partition wall and the accommodation part is inclined at an inclination angle with respect to a reference axis perpendicular to the upper surface of the first substrate, and the inclination angle is 1° to 10°.

15 Claims, 11 Drawing Sheets

(56) References Cited

U.S. PATENT DOCUMENTS

| | | | |
|---|---|---|---|
| 9,874,799 B2 | 1/2018 | Shiota | |
| 2006/0181751 A1 | 8/2006 | Song et al. | |
| 2009/0114916 A1* | 5/2009 | Choo | H10F 77/1662 |
| | | | 257/53 |
| 2010/0103501 A1 | 4/2010 | Wang et al. | |
| 2010/0271721 A1 | 10/2010 | Gaides et al. | |
| 2014/0226093 A1 | 8/2014 | Schwartz et al. | |
| 2017/0010516 A1 | 1/2017 | Shiota | |
| 2020/0176650 A1* | 6/2020 | Achi | G02F 1/133611 |
| 2021/0341801 A1 | 11/2021 | Fang et al. | |

FOREIGN PATENT DOCUMENTS

| | | | |
|---|---|---|---|
| JP | 2007-206373 A | 8/2007 | |
| JP | 2011-28186 A | 2/2011 | |
| JP | 2013-222102 A | 10/2013 | |
| JP | 5895677 B2 | 3/2016 | |
| JP | 2016-62091 A | 4/2016 | |
| JP | 2016-75877 A | 5/2016 | |
| KR | 10-0390527 B1 | 7/2003 | |
| KR | 10-2006-0091068 A | 8/2006 | |
| KR | 10-2009-0021549 A | 3/2009 | |
| KR | 10-2009-0035228 A | 4/2009 | |
| KR | 10-2010-0045273 A | 5/2010 | |
| KR | 10-2010-0106263 A | 10/2010 | |
| KR | 10-1241306 B1 | 3/2013 | |
| KR | 10-2015-0125051 A | 11/2015 | |
| KR | 10-2016-0096263 A | 8/2016 | |
| KR | 10-2018-0004879 A | 1/2018 | |
| KR | 10-2018-0125803 A | 11/2018 | |
| WO | 2015/122083 A1 | 8/2015 | |
| WO | 2019/076126 A1 | 4/2019 | |

OTHER PUBLICATIONS

Supplementary European Search Report dated Feb. 5, 2024 in European Application No. 21741089.3.

Office Action dated May 10, 2024 in Korean Application No. 10-2020-0004838.

Office Action dated May 20, 2024 in Korean Application No. 10-2020-0007802.

International Search Report dated Apr. 20, 2021 in International Application No. PCT/KR2021/000377.

Office Action dated Mar. 19, 2025 in Chinese Application No. 202180009222.8.

* cited by examiner

Fig. 15
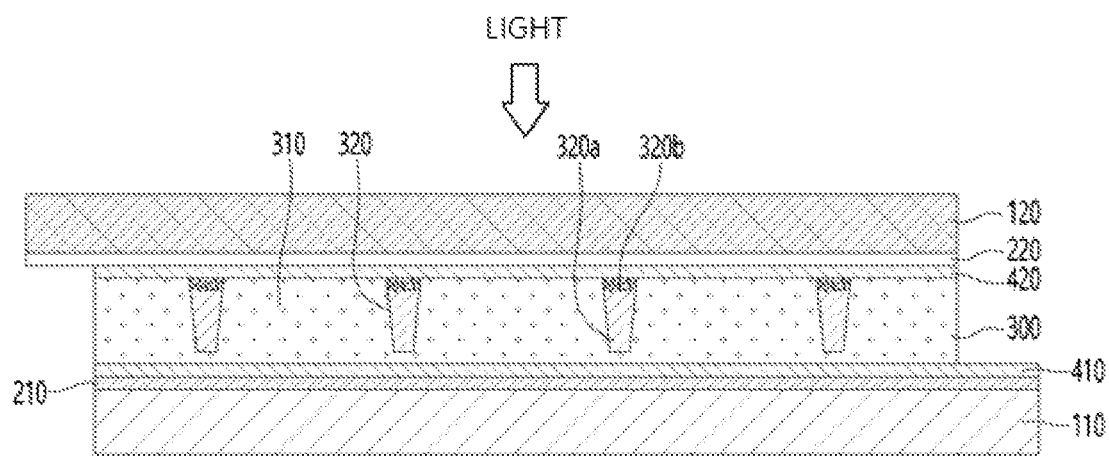
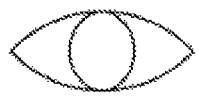
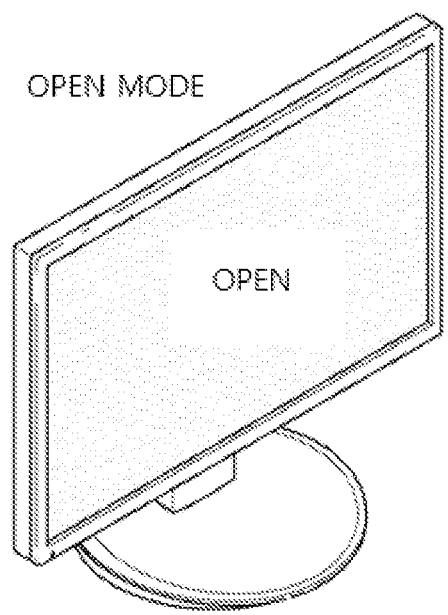

LIGHT ROUTE CONTROL MEMBER AND DISPLAY DEVICE COMPRISING SAME

CROSS-REFERENCE TO RELATED APPLICATIONS

This application is the U.S. national stage application of International Patent Application No. PCT/KR2021/000377, filed Jan. 12, 2021, which claims the benefit under 35 U.S.C. § 119 of Korean Application Nos. 10-2020-0004838, filed Jan. 14, 2020; and 10-2020-0007802, filed Jan. 21, 2020, the disclosures of each of which are incorporated herein by reference in their entirety.

TECHNICAL FIELD

An embodiment relates to a light route control member, and a display device including the same.

BACKGROUND ART

A light-shielding film shields transmitting of light from a light source, and is attached to a front surface of a display panel which is a display device used for a mobile phone, a notebook, a tablet PC, a vehicle navigation device, a vehicle touch, etc., so that the light-shielding film adjusts a viewing angle of light according to an incident angle of light to express a clear image quality at a viewing angle needed by a user when the display transmits a screen.

In addition, the light-shielding film may be used for the window of a vehicle, building or the like to shield outside light partially to inhibit glare, or to inhibit the inside from being visible from the outside.

That is, the light-shielding film may be a light route control member that controls a movement path of light, block light in a specific direction, and transmit light in a specific direction. Accordingly, by controlling the light transmission angle by the light-shielding film, it is possible to control the viewing angle of the user.

Meanwhile, such a light-shielding film may be a light-shielding film that can always control the viewing angle regardless of the surrounding environment or the user's environment, and switchable light-shielding film that allows the user to turn on/off the viewing angle control according to the surrounding environment or the user's environment may be distinguished.

Such a switchable light-shielding film may be implemented by adding electrically moving particles to the pattern part and changing the pattern part into a light transmitting portion and a light blocking portion by dispersion and aggregation of the particles.

Meanwhile, the pattern part may be divided into a plurality of pattern part by a plurality of partition wall parts disposed between the pattern parts.

The pattern part may be formed by forming the shape of the pattern part in a resin material using a mold, and filling the formed pattern part with a dispersion in which light conversion particles are dispersed.

At this time, due to the nature of the molding process, the pattern part is formed while extending from the lower part to the upper part and having an inclined surface with a larger width. Accordingly, there is a problem in that the light movement path is reduced by the width of the pattern part above the pattern part from which the light is emitted, so that the front luminance of the light route control member is reduced.

Accordingly, there is a need for a light route control member having a new structure that can solve the decrease in front luminance according to the inclined surfaces and inclination angles of the partition wall part and the pattern part as described above.

DISCLOSURE

Technical Problem

An embodiment relates to the light route control member having improved front transmittance and side shielding characteristics by controlling the inclination angle of a pattern part and a partition wall part, and a display device including the same.

Technical Solution

A light route control member according to an embodiment includes: a first substrate; a first electrode disposed on the first substrate; a second substrate disposed on the first substrate; a second electrode disposed under the second substrate; and a light conversion part disposed between the first electrode and the second electrode, wherein the light conversion part comprises a partition wall part and a receiving part alternately arranged, and the light transmittance of the receiving part is changed according to application of a voltage, and the receiving part includes a dispersion and light conversion particles dispersed in the dispersion, and a contact surface of the partition wall part and the receiving part is inclined with an inclination angle with respect to a reference axis in a direction perpendicular to the upper surface of the first substrate, and the inclination angle is 1° to 10°.

Advantageous Effects

The light route control member according to the embodiment may control the widths of the upper and lower surfaces of the partition wall part and the receiving part according to the movement path of light.

In detail, the width of the lower surface of the partition wall part through which light is incident and the upper surface of the partition wall part through which light is emitted may be different. That is, the inclined surface is formed by forming a certain inclination angle on the side surface of the partition wall part, which is the contact surface of the partition wall part and the receiving part. Accordingly, the width of the upper surface of the partition wall part through which light is emitted may be greater than the width of the lower surface of the partition wall part through which light is incident.

Therefore, since light incident to the inside of the light route control member and emitted to the outside is emitted through the width of the upper surface of the partition wall part having a relatively large width, the front luminance of the light route control member can be improved according to the increase in the movement path of the light.

That is, when the receiving part of the light route control member is driven by the light blocking part, the width of the area of the emitting surface in the partition wall part area through which light pass may be increased. Accordingly, the movement path of the light is increased, and thus the front luminance of the light route control member can be improved.

In addition, by controlling the inclination angle of the partition wall part and the receiving part, it is possible to control an incident angle, a refraction angle, and total reflection according to a difference in refractive index between the partition wall part and the receiving part. Accordingly, by increasing the amount of light incident to the receiving part of the light route control member, the side shielding effect may be improved.

In addition, by controlling the inclination angle of the partition wall part and the receiving part, it is possible to control an incident angle, a refraction angle, and total reflection according to a difference in refractive index between the partition wall part and the receiving part. Accordingly, even when the receiving part of the light route control member is driven to the light transmitting portion, loss of light can be reduced, so that the front luminance of the light route control member can be improved.

DESCRIPTION OF DRAWINGS

FIGS. 15 to 17 are views for describing one embodiment of the display device to which the light route control member according to the embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a light route control member according to an embodiment will be described with reference to drawings. The light route control member described below relates to a switchable light route control member that drives in various modes according to the movement of electrophoretic particles application of a voltage.

Figure 1:
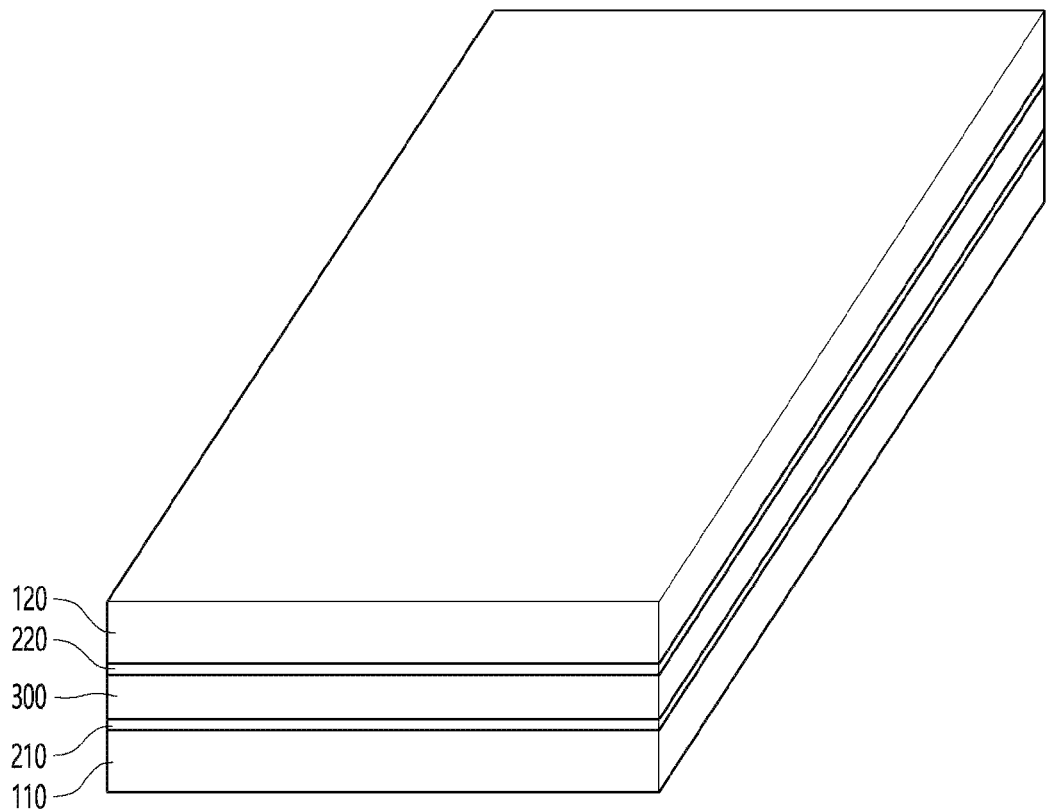
FIG. 1 is a view showing perspective view of a light route control member according to an embodiment.
Figure 2:
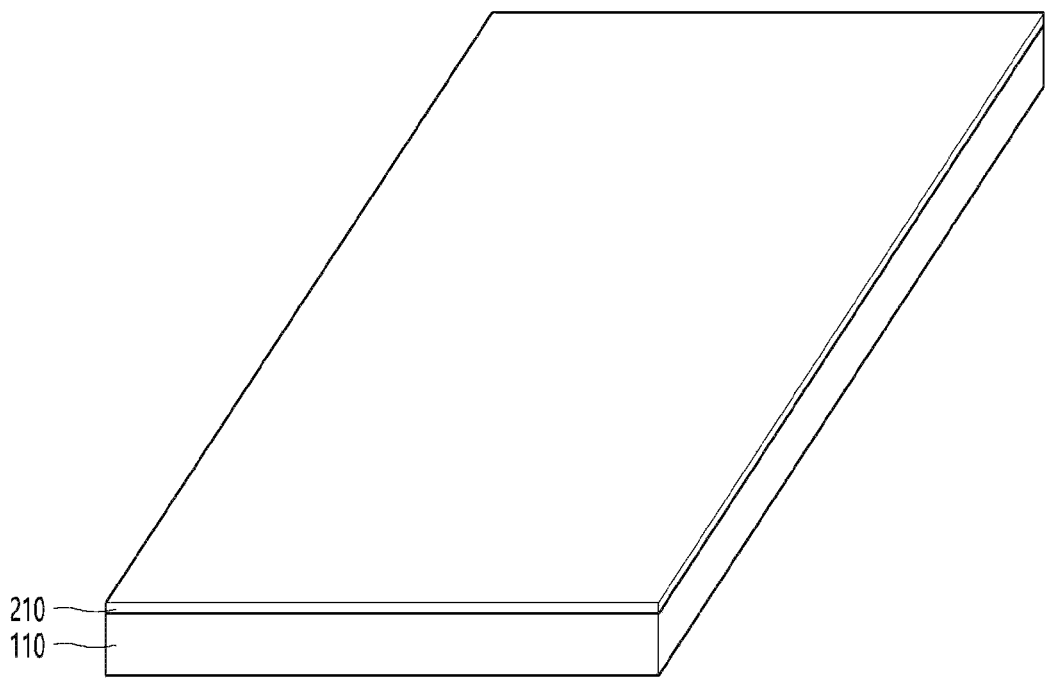
FIGS. 2 and 3 are views showing perspective views of a first substrate and a first electrode and a perspective view of a second substrate and a second electrode of the light route control member according to the embodiment, respectively.
Figure 3:
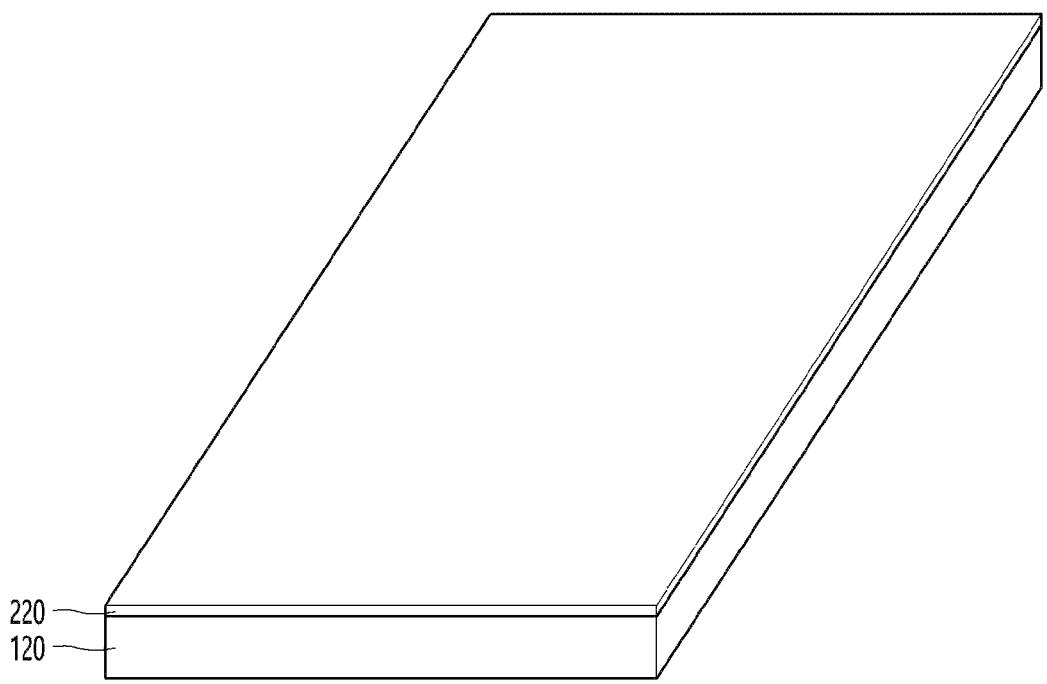

Referring to FIGS. 1 to 3, a light route control member according to an embodiment may include a first substrate 110, a second substrate 120, a first electrode 210, a second electrode 220, and a light conversion part 300.

The first substrate 110 may support the first electrode 210. The first substrate 110 may be rigid or flexible.

In addition, the first substrate 110 may be transparent. For example, the first substrate 110 may include a transparent substrate capable of transmitting light.

The first substrate 110 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the first substrate 110 may be a flexible substrate having flexible characteristics.

Further, the first substrate 110 may be a curved or bended substrate. That is, the light route control member including the first substrate 110 may also be formed to have flexible, curved, or bent characteristics. Accordingly, the light route control member according to the embodiment may be changed to various designs.

The first substrate 110 may have a thickness of 30 um to 80 um.

The first electrode 210 may be disposed on one surface of the first substrate 110. In detail, the first electrode 210 may be disposed on an upper surface of the first substrate 110. That is, the first electrode 210 may be disposed between the first substrate 110 and the second substrate 120.

The first electrode 210 may contain a transparent conductive material. For example, the first electrode 210 may contain a metal oxide such as indium tin oxide, indium zinc oxide, copper oxide, tin oxide, zinc oxide, titanium oxide, etc.

The first electrode 210 may be disposed on the first substrate 110 in a film shape. In detail, light transmittance of the first electrode 210 may be about 80% or more.

The first electrode 210 may have a thickness of about 0.1 um to about 0.5 um.

Alternatively, the first electrode 210 may contain various metals to realize low resistance. For example, the first electrode 210 may contain at least one metal of chromium (Cr), nickel (Ni), copper (Cu), aluminum (Al), silver (Ag), molybdenum (Mo). gold (Au), titanium (Ti), and alloys thereof.

The first electrode 210 may be disposed on the entire surface of one surface of the first substrate 110. In detail, the first electrode 210 may be disposed as a surface electrode on one surface of the first substrate 110. However, the embodiment is not limited thereto, and the first electrode 210 may be formed of a plurality of pattern electrodes having a predetermined pattern.

For example, the first electrode 210 may include a plurality of conductive patterns. In detail, the first electrode 210 may include a plurality of mesh lines intersecting each other and a plurality of mesh openings formed by the mesh lines.

Accordingly, even though the first electrode 210 contains a metal, visibility may be improved because the first electrode is not visible from the outside. In addition, the light transmittance is increased by the openings, so that the brightness of the light route control member according to the embodiment may be improved.

The second substrate 120 may be disposed on the first substrate 110. In detail, the second substrate 120 may be disposed on the first electrode 210 on the first substrate 110.

The second substrate 120 may contain a material capable of transmitting light. The second substrate 120 may contain a transparent material. The second substrate 120 may contain a material the same as or similar to that of the first substrate 110 described above.

For example, the second substrate 120 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example, but the embodiment is not limited thereto.

In addition, the second substrate 120 may be a flexible substrate having flexible characteristics.

Further, the second substrate 120 may be a curved or bended substrate. That is, the light route control member including the second substrate 120 may also be formed to have flexible, curved, or bent characteristics. Accordingly, the light route control member according to the embodiment may be changed to various designs.

The second substrate 120 may have a thickness of 30 mm to 80 mm.

The second electrode 220 may be disposed on one surface of the second substrate 120. In detail, the second electrode 220 may be disposed on a lower surface of the second substrate 120. That is, the second electrode 220 may be disposed on a surface on which the second substrate 120 faces the first substrate 110. That is, the second electrode 220 may be disposed facing the first electrode 210 on the first substrate 110. That is, the second electrode 220 may be disposed between the first electrode 210 and the second substrate 120.

The second electrode 220 may contain a transparent conductive material. For example, the second electrode 220 may contain a metal oxide such as indium tin oxide, indium zinc oxide, copper oxide, tin oxide, zinc oxide, titanium oxide, etc.

The second electrode 220 may be disposed on the first substrate 110 in a film shape. In addition, the light transmittance of the second electrode 220 may be about 80% or more.

The second electrode 220 may have a thickness of about 0.1 um to about 0.5 um.

Alternatively, the second electrode 220 may contain various metals to realize low resistance. For example, the second electrode 220 may contain at least one metal of chromium (Cr), nickel (Ni), copper (Cu), aluminum (Al), silver (Ag), molybdenum (Mo). gold (Au), titanium (Ti), and alloys thereof.

The second electrode 220 may be disposed on the entire surface of one surface of the second substrate 120. In detail, the second electrode 220 may be disposed as a surface electrode on one surface of the second substrate 120. However, the embodiment is not limited thereto, and the second electrode 220 may be formed of a plurality of pattern electrodes having a predetermined pattern.

For example, the second electrode 220 may include a plurality of conductive patterns. In detail, the second electrode 220 may include a plurality of mesh lines intersecting each other and a plurality of mesh openings formed by the mesh lines.

Accordingly, even though the second electrode 220 contains a metal, visibility may be improved because the second electrode 220 is not visible from the outside. In addition, the light transmittance is increased by the openings, so that the brightness of the light route control member according to the embodiment may be improved.

The light conversion part 300 may be disposed between the first substrate 110 and the second substrate 120. In detail, the light conversion part 300 may be disposed between the first electrode 210 and the second electrode 220.

An adhesive layer 400 may be disposed at least one of between the light conversion part 300 and the first substrate 110 and between the light conversion part 300 and the second substrate 120, and the first substrate 110, the second substrate 120, and the light conversion part 300 may be adhered to each other by the adhesive layer 400.

Figure 4:
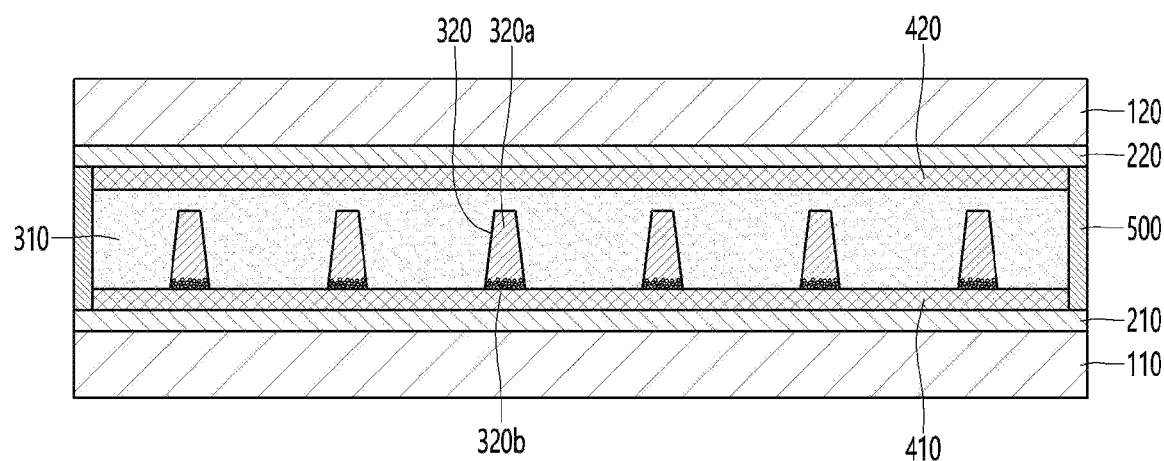
FIGS. 4 and 5 are views showing cross-sectional views of the light route control member according to the embodiment.
Figure 5:
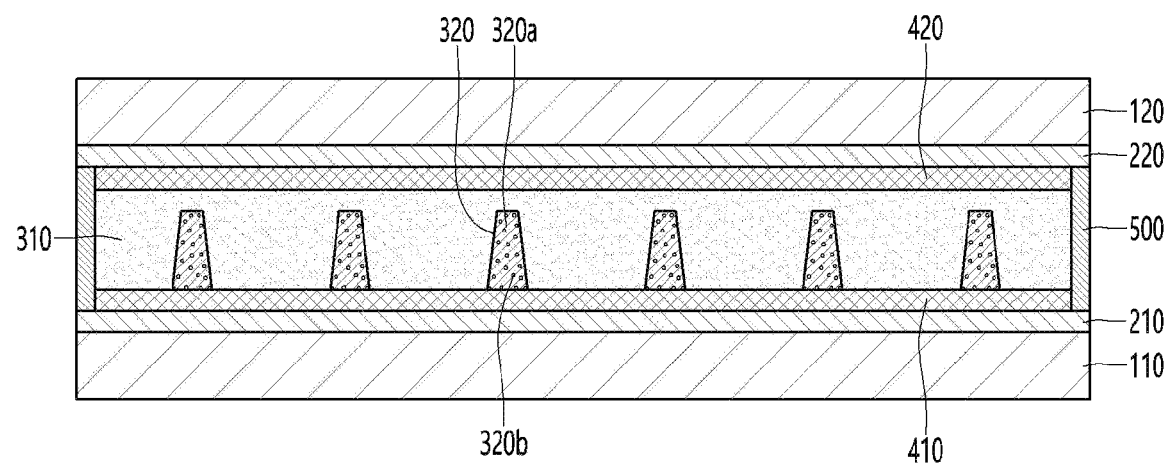

Referring to FIGS. 4 and 5, the adhesive layer 410 is disposed between the first electrode 210 and the light conversion par 300, whereby the light conversion part 300 and the first electrode 210 may be adhered to each other.

In addition, a buffer layer 420 for improving adhesion between the light conversion part 300 and the first electrode 210 is disposed between the light conversion part 300 and the second electrode 220, and the light conversion unit 300 and the second electrode 220, which are different materials, may be easily bonded through the buffer layer 420.

The light conversion part 300 may include a partition wall part 310 and a receiving part 320.

The partition wall part 310 may be defined as a partition wall region that partitions the receiving part. That is, the partition wall part 310 is a partition wall region partitioning a plurality of receiving parts. And the receiving part 320 may be defined as a region that changes into a light blocking part and a light transmitting part according to the application of a voltage.

The partition wall part 310 and the receiving part 320 may be alternately disposed with each other. The partition wall part 310 and the receiving part 320 may be disposed to have different widths. For example, the width of the partition wall portion 310 may be greater than the width of the receiving part 320.

The partition wall part 310 and the receiving part 320 may be alternately disposed with each other. In detail, the partition wall part 310 and the receiving part 320 may be alternately disposed with each other. That is, each of the partition wall portions 310 may be disposed between the receiving parts 320 adjacent to each other, and each of the receiving parts 320 may be disposed between the adjacent partition wall portions 310.

The partition wall part 310 may contain a transparent material. The partition wall part 310 may contain a material that may transmit light.

The partition wall part 310 may contain a resin material. The partition wall part 310 may contain a photo-curable resin material. As an example, the partition wall part 310 may contain a UV resin or a transparent photoresist resin. Alternatively, the partition wall part 310 may contain urethane resin or acrylic resin.

The partition wall part 310 may transmit light incident on any one of the first substrate 110 and the second substrate 120 toward another substrate.

For example, in FIGS. 4 and 5, light may be emitted in the direction of the second substrate 120 and may be incident in the direction of the first substrate 110. The partition wall part 310 transmits the light, and the transmitted light may move in the direction of the second substrate 120.

A sealing part 500 sealing the light route control member may be disposed on a side surface of the partition wall part, and a side surface of the light conversion part 300 may be sealed by the sealing part.

The receiving part 320 may include a light conversion material 330 including a dispersion 320a and light conversion particles 320b. In detail, the dispersion 320a may be filled in the receiving part 320, and a plurality of light conversion particles 320b may be dispersed in the dispersion 330a.

The dispersion 320a may be a material for dispersing the light conversion particles 320b. The dispersion 320a may contain a transparent material. The dispersion 320a may contain a non-polar solvent. In addition, the dispersion 320a may contain a material capable of transmitting light. For example, the dispersion 320a may include at least one of a halocarbon-based oil, a paraffin-based oil, and isopropyl alcohol.

The light conversion particles 320b may be disposed to be dispersed in the dispersion 330a. In detail, the plurality of light conversion particles 320b may be disposed to be spaced apart from each other in the dispersion 330a.

The light conversion particles 320b may include a material capable of absorbing light. That is, the light conversion particle 320b may be a light absorbing particle. The light conversion particle 320b may have a color. For example, the light conversion particles 320b may have a black-based color. For example, the light conversion particles 320b may include carbon black particles.

The surface of the light conversion particle 320b may be charged. Accordingly, according to the application of the voltage, the light conversion particles 320b may move in one direction.

The light transmittance of the receiving part 320 may be changed by the light conversion particles 320b. In detail, the receiving part 320 may be changed into a light blocking part and a light transmitting part by changing the light transmittance by the light conversion particles 320b. That is, the receiving part 320 may change the transmittance of the light passing through the receiving part 320 by dispersion and aggregation of the light conversion particles 320b disposed therein in the dispersion 320a.

For example, the light path member according to the embodiment may be change from the first mode to the second mode or from the second mode to the first mode by a voltage applied to the first electrode 210 and the second electrode 220.

In detail, in the light route control member 1000 according to the embodiment, the receiving part 320 becomes the light blocking part in the first mode, and light of a specific angle may be blocked by the receiving part 320. That is, a viewing angle of the user viewing from the outside may be narrowed.

In addition, in the light route control member 1000 according to the embodiment, the receiving part 320 becomes the light transmitting part in the second mode, and in the light route control member according to the embodiment, light may be transmitted through both the partition wall part 310 and the receiving part 320. That is, the viewing angle of the user viewing from the outside may be widened.

Switching from the first mode to the second mode, that is, the conversion of the receiving part 320 from the light blocking part to the light transmitting part may be realized by movement of the light conversion particles 320b of the receiving part 320. That is, the light conversion particles 320b have electric charges on their surface, and may move in the direction of the first electrode 210 or the second electrode 220 by an applied voltage or by characteristics of the charge. That is, the light conversion particles 320b may be electrophoretic particles.

In detail, the receiving part 320 may be electrically connected to the first electrode 210 and the second electrode 220.

In this case, when a voltage is not applied to the light route control member from the outside, the light conversion particles 320b of the receiving part 320 are uniformly dispersed in the dispersion 330a, and light may be blocked by the light conversion particles in the receiving part 320. Accordingly, in the first mode, the receiving part 320 may be driven as the light blocking part.

Alternatively, when a voltage is applied to the light route control member from the outside, the light conversion particles 320b may move. For example, the light conversion particles 320b may move toward one end or the other end of the receiving part 320 by a voltage transmitted through the first electrode 210 and the second electrode 220. That is, the light conversion particles 320b may move from the receiving part 320 toward the first electrode or the second electrode.

In detail, when a voltage is applied to the first electrode 210 and/or the second electrode 220, an electric field is formed between the first electrode 210 and the second electrode 220. And, the light conversion particles 320b in a negatively charged state can be moved in the direction of the positively charged electrode among the first electrode 210 and the second electrode 220 using the dispersion 320a as a medium.

In detail, when a voltage is applied to the first electrode 210 and/or the second electrode 220, an electric field is formed between the first electrode 210 and the second electrode 220, and the charged carbon black, that is, the light conversion particles may be moved toward a positive electrode of the first electrode 210 and the second electrode 220 using the dispersion 320a as a medium.

That is, when the voltage is applied to the first electrode 210 and/or the second electrode 220, as shown in FIG. 4, the light conversion particles 320b may be moved toward the first electrode 210 in the dispersion 330a. That is, the light conversion particles 320b are moved in one direction, and the receiving part 320 may be driven as the light transmitting part.

In addition, when the voltage is not applied to the first electrode 210 and/or the second electrode 220, as shown in FIG. 5, the light conversion particles 320b may be uniformly dispersed in the dispersion 320a to drive the receiving part 30202 as the light blocking part.

Accordingly, the light route control member according to the embodiment may be driven in two modes according to a user's surrounding environment. That is, when the user requires light transmission only at a specific viewing angle, the receiving unit is driven as the light blocking part, or in an environment in which the user requires high brightness, a voltage may be applied to drive the receiving unit as the light transmitting part.

Therefore, since the light route control member according to the embodiment may be implemented in two modes according to the user's requirement, the light route control member may be applied regardless of the user's environment.

Meanwhile, in the light route control member according to the embodiment, the partition wall part 310 and the receiving part 320 may have opposite shapes.

In detail, when the surface where the partition wall part 310 and the first electrode 210 contact is defined as the lower surface of the partition wall part, and the opposite surface is defined as the upper surface of the partition wall part, a width W2a of a lower surface of the partition wall part may be smaller than a width W2b of an upper surface of the partition wall part.

In addition, when a surface in which the receiving part 320 and the first electrode 210 contact is defined as the lower surface of the receiving part and the opposite surface is defined as the upper surface of the receiving part, a width of the lower surface W1a of the receiving part may be greater than the width W1b of the upper surface of the receiving part.

For example, assuming that light is incident on the lower surface of the first substrate 110 and the light is emitted toward the upper surface of the second substrate 120, the partition wall part has a width of the incident surface greater than a width of the light emitting surface, and the receiving part have a width of the emitting surface smaller than a width of the light incident surface That is, in the partition wall part 310, a width W2b of an upper surface of the partition wall part from which the light is emitted is greater than a width W2a of a lower surface through which the light is incident. And, in the receiving part 320, a width W1b of an upper surface of the receiving part from which the light is emitted may be smaller than a width W1a of a lower surface through which the light is incident.

That is, the width W2b of the upper surface of the partition wall part 310 may be greater than the width W2a of the lower surface of partition wall part facing the display panel from which the light is emitted.

Accordingly, in the first mode (that is, when a voltage is applied and the light conversion particles 320b are dispersed in the dispersion 320a, the receiving prat 320 is driven as a light blocking part) of the light route control member according to the embodiment, the front luminance of the light route control member may be improved.

That is, when the light route control member is driven in the first mode, the area from which the light is emitted from the light route control member is the area of the partition wall part 310. In this case, by increasing the width of the upper surface of the partition wall part from which the light is emitted, the amount of light emitted toward the second substrate 120 may be increased.

Accordingly, the light route control member according to the embodiment may increase the amount of emitted light, thereby improving the front luminance of the light route control member.

Figure 6:
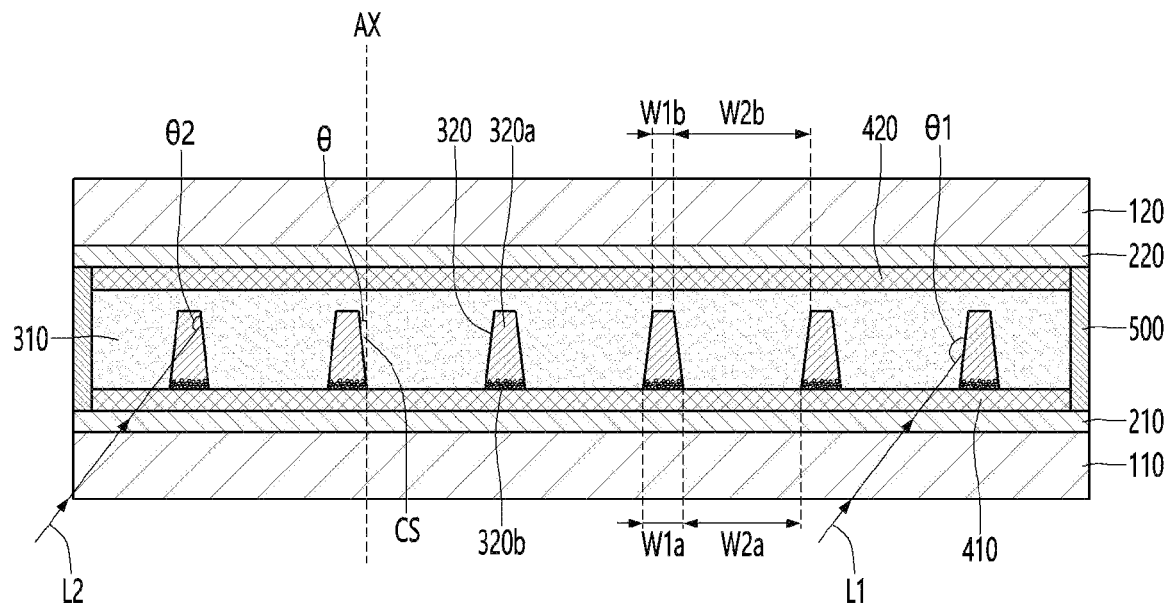
FIG. 6 is a view illustrating a cross-sectional view of a light route control member according to an embodiment for explaining a light path.

Meanwhile, referring to FIG. 6, in the light route control member according to the embodiment, the partition wall part 310 and the receiving part 320 may have inclined surfaces. In detail, the partition wall part 310 and the receiving part 320 may include surfaces in contact with each other, and the contact surfaces CS of the partition wall part 310 and the receiving part 320 may have inclined surfaces. That is, the contact surface may be an inclined surface of the partition wall part 310 and an inclined surface of the receiving part 320.

In detail, the partition wall part 310 or the receiving part 320 may include an inclined surface having an inclination angle $\theta$ with respect to the reference axis AX, which is a direction perpendicular to the upper surface of the first substrate 110.

In this case, the widths of the inclined surfaces facing each other may be inclined so that the width of the partition wall part increases while extending from the lower surface of the partition wall part toward the upper surface of the partition wall part.

Alternatively, the widths of the inclined surfaces facing each other may be inclined so that the width of the receiving part decreases while extending from the lower surface of the receiving part toward the upper surface of the receiving part.

In addition, the inclined surface may be inclined such that the width of the partition wall part increases and the width of the receiving part decreases while extending in the movement direction of the light.

For example, the contact surface CS, which is an inclined surface of the partition wall part 310 and the receiving part 320, may be inclined while having an inclination angle of 10° or less from the reference axis AX, which is a direction perpendicular to the upper surface of the first substrate 110. In detail, the inclined surface of the partition wall part 310 or the receiving part 320 may be inclined while having an inclination angle of 5° or less from the reference axis AX, which is a direction perpendicular to the upper surface of the first substrate 110. In more detail, the inclined surface of the partition wall part 310 or the receiving part 320 may be inclined while having an inclination angle of 3° or less from the reference axis AX, which is a direction perpendicular to the upper surface of the first substrate 110. In more detail, the inclined surface of the partition wall part 310 or the receiving part 320 may be inclined while having an inclination angle of 1° to 3° from the reference axis AX, which is a direction perpendicular to the upper surface of the first substrate 110.

It is difficult to implement the inclination angle of the partition wall part 310 or the receiving part 320 at an inclination angle of less than 1° with the reference axis AX, which is a direction perpendicular to the upper surface of the first substrate 110. That is, an imprinting process is performed to form the partition wall part and the receiving part.

Due to the characteristics of the mold for forming the partition wall part and the receiving part and materials constituting the partition wall part, the partition wall part and the receiving part have inclined surfaces of a certain inclination angle. At this time, it may be difficult to form the inclined surface of the partition wall part 310 or the receiving part 320 at an inclination angle of less than 1° with the reference axis AX, which is a direction perpendicular to the upper surface of the first substrate 110.

In addition, when the inclined surface of the partition wall part 310 or the receiving part 320 has an inclination angle exceeding 10° with the reference axis AX, which is a direction perpendicular to the upper surface of the first substrate 110, the amount of emitted light of the light route control member may be reduced, and thus the front luminance of the light route control member may be reduced.

The partition wall part 310 and the receiving part 320 may have different refractive indices.

In detail, the refractive index of the partition wall part 310 may be 1.64 or less. In detail, the refractive index of the partition wall part 310 may be 1.36 to 1.64. The refractive index of the partition wall part 310 may correspond to the refractive index of the resin composition constituting the partition wall part.

In addition, the refractive index of the receiving part 320 may be 1.45 or less. In detail, the refractive index of the receiving part 320 may be 1.42 to 1.45. The refractive index of the receiving part 320 may correspond to the refractive index of the dispersion 320a contained in the receiving part 320.

That is, the refractive index of the partition wall part 310 may be relatively larger than that of the receiving part 320.

Accordingly, the light moving from the first substrate 110 to the second substrate 120 direction may have different characteristics when it moves from the partition wall part 310 to the receiving part 320 and when it moves from the receiving part 320 to the partition wall part 310.

For example, an incident angle $\theta 1$ of the first light L1 moving from the partition wall part 310 to the receiving part 320 and an incident angle $\theta 2$ of the second light L2 moving from the receiving part 320 to partition wall part 310 may be different.

That is, the first light L1 moving from a region having a large refractive index to a region having a small refractive index may have a small incident angle, and the second light L2 moving from the area having the small refractive index to the area having the large refractive index may have a relatively larger incident angle than the first light L1.

In this case, an inclined surface having a predetermined angle may be formed on the partition wall part 310 and the receiving part 320. Accordingly, the incident angle of the second light L2 moving from the region having the small refractive index to the region having the large refractive index, that is, moving from the receiving part 320 to the partition wall part 310 may be reduced.

Accordingly, total reflection of the second light L2 may be reduced, and light loss due to total reflection may be reduced, thereby improving the front luminance of the light route control member.

That is, since the refractive index of the partition wall part 310 is greater than that of the receiving part 320, the light loss due to total reflection may be greater for the second light L2 than the first light L1. Accordingly, by minimizing the incident angle of the second light L2, total reflection may be reduced. Accordingly, the front luminance of the light route control member in the second mode can be improved.

In addition, by forming an inclined surface of a predetermined angle in the above shape on the partition wall part 310 and the receiving part 320, the amount of incident light incident into the receiving part 320 may be increased. Accordingly, the side shielding effect in the first mode can be improved.

The partition wall part 310 and the receiving part 320 may be disposed to have different widths.

In detail, the width W2a of the lower surface of the partition wall part and the width W1a of the lower surface of the receiving part may be different from each other. Alternatively, the width W2b of the upper surface of the partition wall part and the width W1b of the upper surface of the receiving part may be different from each other.

In detail, the maximum width of the receiving part may be about 10% to 40% of the sum of the widths of the receiving part and the partition wall part, and the maximum width of the partition wall part may be about 60% to 90% of the sum of the widths of the receiving part and the partition wall part.

When the maximum width of the receiving part exceeds 40% of the sum of the widths of the receiving part and the partition wall part, the receiving part may be visually recognized from the outside, and thus the visibility of the light route control member may be reduced. In addition, when the maximum width of the receiving part is less than 10% of the sum of the widths of the receiving part and the partition wall, the width of the receiving part is too narrow, and a defect may occur when injecting the dispersion into the receiving part.

For example, the sum of the width W2a of the lower surface of the partition wall part and the width W1a of the lower surface of the receiving part or the sum of the width W2b of the upper surface of the partition wall part and the width W1b of the upper surface of the receiving part may be about 100 μm.

When the sum of the width W2a of the lower surface of the partition wall part and the width W1a of the lower surface of the receiving part or when the sum of the width W2b of the upper surface of the partition wall part and the width W1b of the upper surface of the receiving part exceeds 100 μm, it is difficult to arrange a plurality of receiving part in the light route control member, and the spacing between the receiving part may be reduced, so that the side shielding effect may be reduced.

Figure 7:
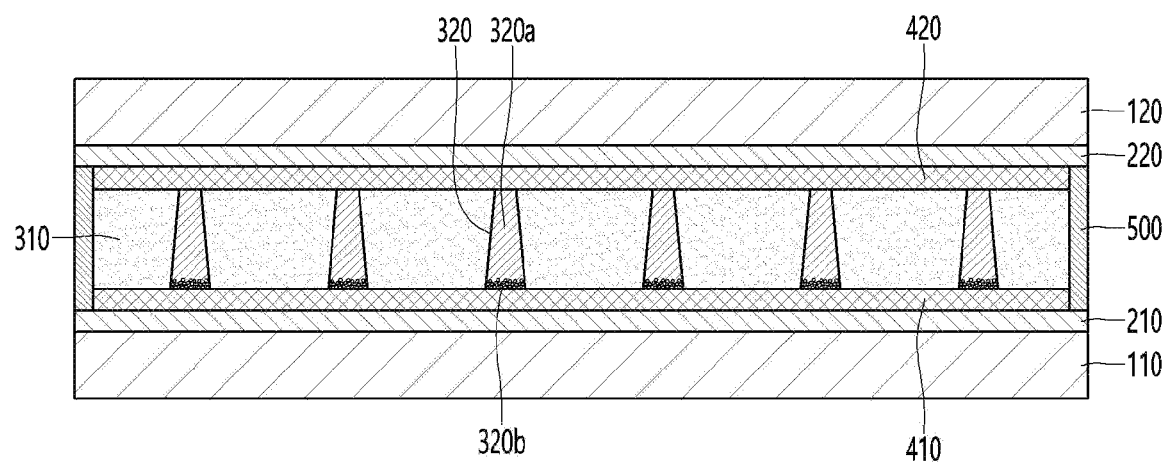
FIGS. 7 and 8 are views showing cross-sectional views of the light route control member according to another embodiment.
Figure 8:
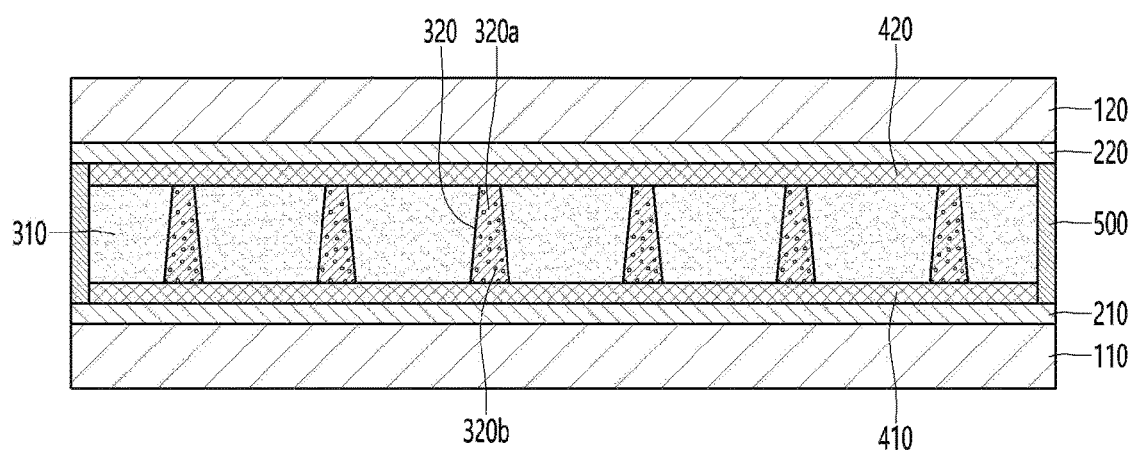

FIGS. 7 to 8 are views illustrating other cross-sectional views of the light route control member according to the embodiment.

Referring to FIGS. 7 and 8, in the light route control member according to the embodiment, the receiving part 320 may be disposed in contact with the electrode differently from FIGS. 4 and 5.

For example, the receiving part 320 may be disposed in direct contact with the first electrode 210.

Accordingly, the first electrode 210 and the receiving part 320 are not spaced apart, but are disposed in direct contact with each other. Accordingly, the voltage applied from the first electrode 2100 may be easily transmitted to the receiving part 320.

Accordingly, since the moving speed of the light conversion particle 320b inside the receiving part 320 can be improved, the driving characteristics of the light route control member can be improved.

The light route control member according to the embodiment may control the widths of the upper and lower surfaces of the partition wall part and the receiving part according to the movement path of light.

In detail, the width of the lower surface of the partition wall part through which light is incident and the upper surface of the partition wall part through which light is emitted may be different. That is, the inclined surface is formed by forming a certain inclination angle on the side surface of the partition wall part, which is the contact surface of the partition wall part and the receiving part. Accordingly, the width of the upper surface of the partition wall part through which light is emitted may be greater than the width of the lower surface of the partition wall part through which light is incident.

Therefore, since light incident to the inside of the light route control member and emitted to the outside is emitted through the width of the upper surface of the partition wall part having a relatively large width, the front luminance of the light route control member can be improved according to the increase in the movement path of the light.

That is, when the receiving part of the light route control member is driven by the light blocking part, the width of the area of the emitting surface in the partition wall part area through which light pass may be increased. Accordingly, the movement path of the light is increased, and thus the front luminance of the light route control member can be improved.

In addition, by controlling the inclination angle of the partition wall part and the receiving part, it is possible to control an incident angle, a refraction angle, and total reflection according to a difference in refractive index between the partition wall part and the receiving part. Accordingly, by increasing the amount of light incident to the receiving part of the light route control member, the side shielding effect may be improved.

In addition, by controlling the inclination angle of the partition wall part and the receiving part, it is possible to control an incident angle, a refraction angle, and total reflection according to a difference in refractive index between the partition wall part and the receiving part. Accordingly, even when the receiving part of the light route control member is driven to the light transmitting portion, loss of light can be reduced, so that the front luminance of the light route control member can be improved.

Hereinafter, the present invention will be described in more detail through the transmittance of the light route control member according to the embodiments. These embodiments are merely presented as examples in order to explain the present invention in more detail. Therefore, the present invention is not limited to these examples.

EXAMPLE 1

The light path control member described above is manufactured.

In detail, the first electrode was disposed on the first substrate, and the second electrode was disposed on the second substrate. Then, a light conversion part including a partition wall part and a receiving part was disposed on the first electrode and adhered, and the second substrate and the second electrode is disposed and adhered on the light conversion part to form a light route control member.

In this case, the contact surface of the partition wall part and the receiving part is formed as an inclined surface having an inclination angle.

While extending in the direction of the emitted light from the incident light passing through the light path control member, the inclined surface is inclined so that the width of the receiving part is narrowed, that is, the width of the partition wall part is widened.

Then, the front transmittance and the side transmittance of the light route control member are measured.

COMPARATIVE EXAMPLE

The light route control member was manufactured in the same manner as in Example.

In this case, the contact surface of the partition wall part and the receiving part is formed as an inclined surface having an inclination angle.

While extending in the direction of the emitted light from the incident light passing through the light path control member, the inclined surface is inclined so that the width of the receiving part is widened, that is, the width of the partition wall part is narrowed.

Then, the front transmittance and the side transmittance of the light route control member are measured.

TABLE 1

|  | Front transmittance | | |
| --- | --- | --- | --- |
|  | Minimum | Average | Maximum |
| Example | 70.0% | 78.5% | 86.0% |
| Comparative Example | 57.1% | 66.0% | 71.3% |

TABLE 2

|  | Side transmittance | | |
| --- | --- | --- | --- |
|  | Minimum | Average | Maximum |
| Example | 0.7% | 2.6% | 6.4% |
| Comparative Example | 1.1% | 3.2% | 7.1% |

Referring to Tables 1 and 2, the light route control member according to the embodiment has a higher front transmittance and lower side transmittance than the light route control member according to the comparative example.

That is, the light route control member according to the embodiment has better front luminance and side shielding effect than the light route control member according to the comparative example.

That is, the light route control member according to the embodiment may improve the front luminance and side shielding effect compared to the light route control member by controlling the shapes and inclination angles of the inclined surfaces of the partition wall part and the receiving part.

Hereinafter, the light route control member according to another embodiment will be described with reference to FIGS. 9 to 12. In the description of the light route control member according to another embodiment, descriptions that are similar to those of the light route control member according to the above-described embodiment will be omitted, and the same reference numerals will be given to the same components.

Referring to FIGS. 9 to 12, in the light route control member according to another embodiment, the surface resistance and the volume resistance of the partition wall part 310 may be controlled in order to implement the improved characteristics of the light conversion part.

In detail, the partition wall part 310 may have a high volume resistance while having a low surface resistance.

The surface resistance of the partition wall part 310 may be controlled by adding a charged particle agent to the inside of the partition wall part 310. In detail, the partition wall part 310 may implement a surface resistance of a certain size range by adding a certain weight % of an antistatic agent to the photocurable resin.

For example, the partition wall part may implement a surface resistance of a certain size range by adding about 0.01 wt % to 10 wt % of an antistatic agent to the entire resin composition forming the partition wall part.

The antistatic agent may include various antistatic agents such as nano-metal particles such as carbon, ITO, ZTO, and silver, conductive polymers, and low molecular weight polymers.

The antistatic agent may serve to reduce the surface resistance of the partition wall part by moving to the surface of the partition wall part within the resin composition forming the partition wall part.

That is, the antistatic agent may be disposed on the surface of the partition wall part inside the partition wall part, and thus, the surface resistance of the partition wall part may be reduced while maintaining the volume resistance of the partition wall part by the antistatic agent.

For example, the surface resistance of the partition wall part 310 may be $10^{12}$ Ω/sq or less. In detail, the surface resistance of the partition wall part 310 may be $10^5$ Ω/sq to $10^{12}$ Ω/sq. The process of implementing the surface resistance of the partition wall part 310 to be less than $10^5$ Ω/sq may be difficult to implement. When the surface resistance of the partition wall part 310 exceeds $10^{12}$ Ω/sq, a driving voltage for forming a potential difference between the first electrode 210 and the second electrode 220 increases due to the resistance of the partition wall part. Therefore, the driving characteristics may be reduced.

In addition, the volume resistance of the partition wall part 310 may be $10^{10}$ Ω·cm or less. In detail, the volume resistance of the partition wall part 310 may be $10^5$ Ω·cm to $10^{10}$ Ωcm, a leakage current may be increased in the partition wall part 310 between the receiving parts 320, thereby the driving efficiency of the light route control member may be reduced. In addition, when the volume resistance of the partition wall part 310 is formed to exceed $10^{10}$ Ω·cm, due to the resistance of the partition wall part, a driving voltage increases to form a potential difference between the first electrode 210 and the second electrode 220, and thereby, there is a problem in that driving characteristics are reduced.

That is, since the surface resistance of the partition wall part of the light route control member according to the embodiment is reduced in a certain range, a potential difference between the first electrode and the second electrode can be formed with a low driving voltage, thereby, it is possible to move the light conversion particles inside the receiving part. That is, since the surface resistance of the interface between the partition wall part and the first electrode and the interface between the partition wall part and the second electrode is reduced, it is possible to move the light conversion particles inside the receiving part with a low driving voltage.

In addition, it is possible to minimize an increase in leakage current in the direction of the partition wall part between the receiving parts by maintaining the volume resistance of the partition wall part in a constant range.

Accordingly, the light route control member according to the embodiment can be driven with a low driving voltage, thereby improving driving characteristics, and minimizing leakage current to reduce power consumption, thereby improving driving efficiency.

Figure 9:
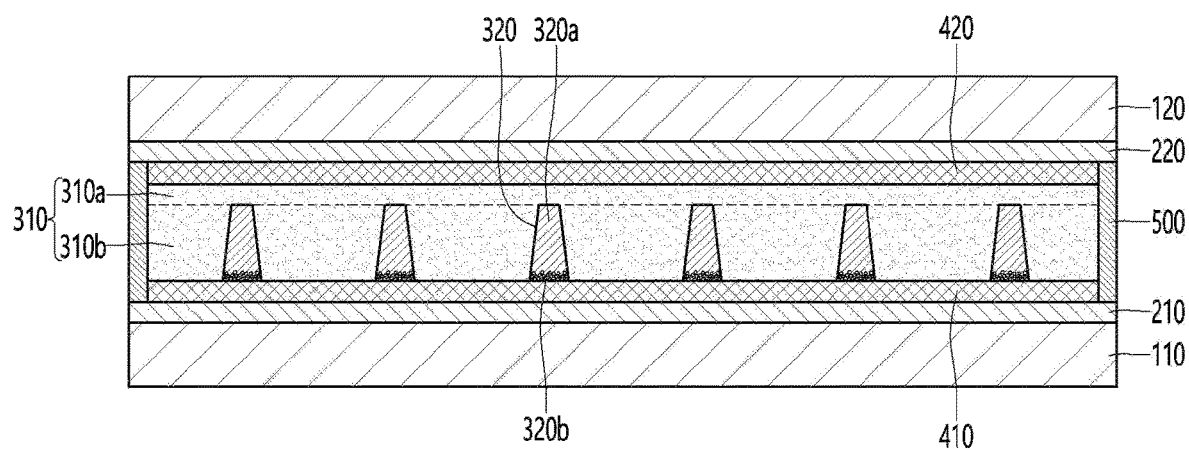
FIGS. 9 to 10 are views showing cross-sectional views of the light route control member according to another embodiment.
Figure 10:
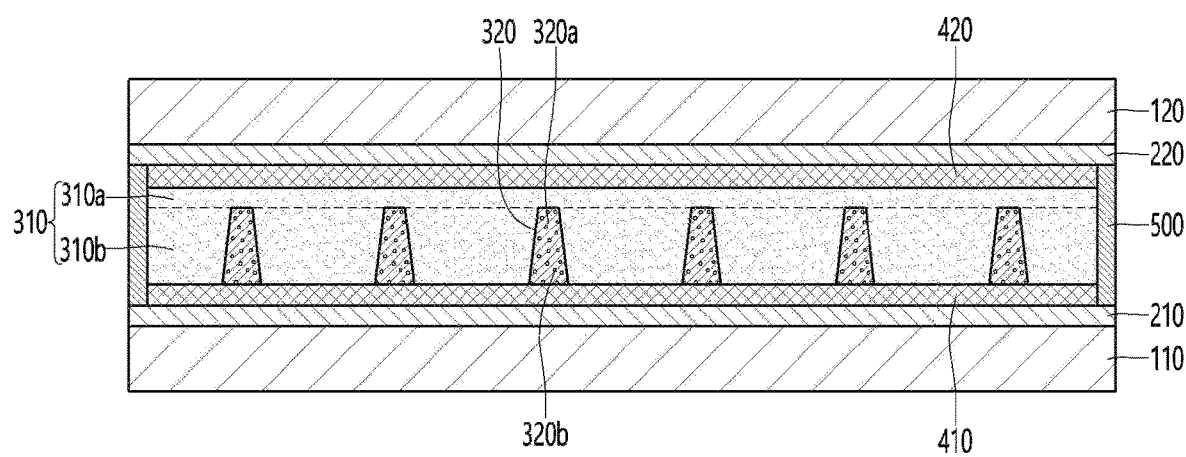

Meanwhile, referring to FIGS. 9 and 10, the partition wall part 310 may be defined as a first partition wall part 310a and a second partition wall part 310b according to positions.

For example, the first partition wall part 310a may be defined as a region between the second electrode 220 and the receiving part 320. That is, the first partition wall part 310a may be defined as a region between the lower surface of the second electrode 220 and the upper surface of the receiving part 320 among the partition wall part areas.

Also, the second partition wall part 310b may be defined as a region between the first partition wall part 310a and the first electrode 210. That is, the second partition wall part 310b may be defined as an area between the receiving parts 320 in the area between the first partition wall part 310a and the first electrode 210 among the partition wall part areas.

In addition, the first partition wall part 310a and the second partition wall part 310b may be defined as relative positions of the first electrode 210 and the second electrode 220.

In detail, the first partition wall part 310a may be defined as a partition wall part disposed closer to the second electrode 220 than the first electrode 210, and the second partition wall part 310b may be defined as a partition wall part disposed closer to the first electrode 210 than the second electrode 220.

For example, the first partition wall part 310a may be a base partition wall part disposed close to the second electrode, and the second partition wall part 310b may be a separation partition wall part disposed close to the first electrode.

The first partition wall part 310a and the second partition wall part 310b may have different resistances. In detail, the first partition wall part 310a and the second partition wall part 310b may have different volume resistances and different surface resistances.

For example, the first partition wall part 310a and the second partition wall part 310b may have different surface resistances. In detail, the first partition wall part 310a may have a lower surface resistance than the second partition wall part 310b.

For example, by varying the content of the antistatic agent included in the partition wall part for each location, the surface resistance of the first partition wall part 310a and the second partition wall part 310b can be controlled.

In detail, the content of the antistatic agent included in the partition wall part may be greater in the first partition wall part 310a than the second partition wall part 310b. Accordingly, the surface resistance effect of the antistatic agent may be increased in the first partition wall part 310a.

Accordingly, by reducing the surface resistance of the first partition wall part 310a, the resistance between the first electrode 210 and the second electrode 220 can be reduced. Accordingly, a potential difference between the first electrode 210 and the second electrode 220 may be realized with a low driving voltage.

Also, the first partition wall part 310a and the second partition wall part 310b may have different volume resistances. In detail, the second partition wall part 310b may have a higher volume resistance than the first partition wall part 310a.

Alternatively, the first partition wall part 310a and the second partition wall part 310b may have the same or similar volume resistance.

That is, the first partition wall part 310a and the second partition wall part 310b may have the same or different resistances in a volume resistance range of $10^{15}$ Ω·cm to $10^{19}$ Ω·cm.

Accordingly, it is possible to increase the volume resistance of the partition wall part between the receiving part, thereby reducing the leakage current flowing from the receiving part to the partition wall part, thereby improving the driving efficiency of the light route control member.

Figure 11:
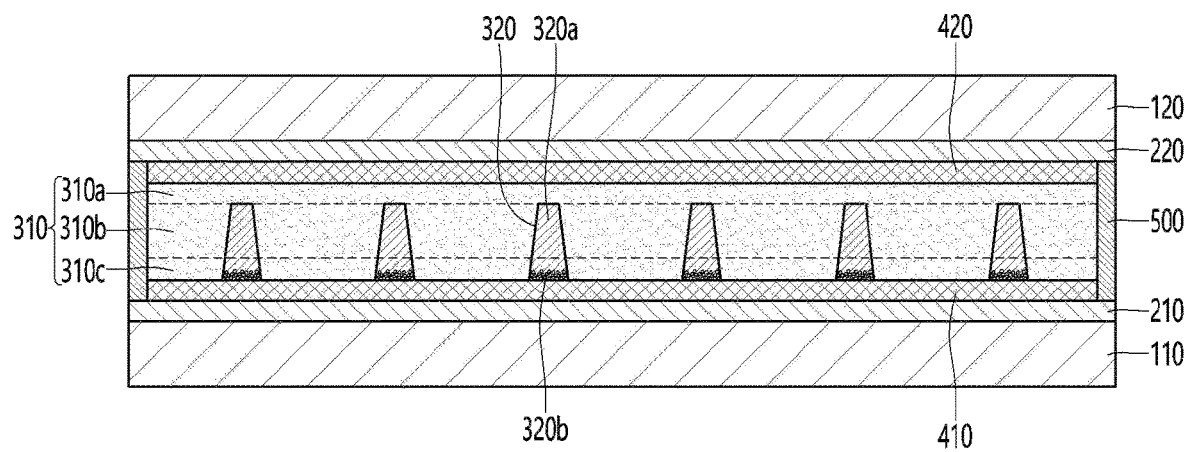
FIGS. 11 to 12 are views showing cross-sectional views of the light route control member according to another embodiment.
Figure 12:
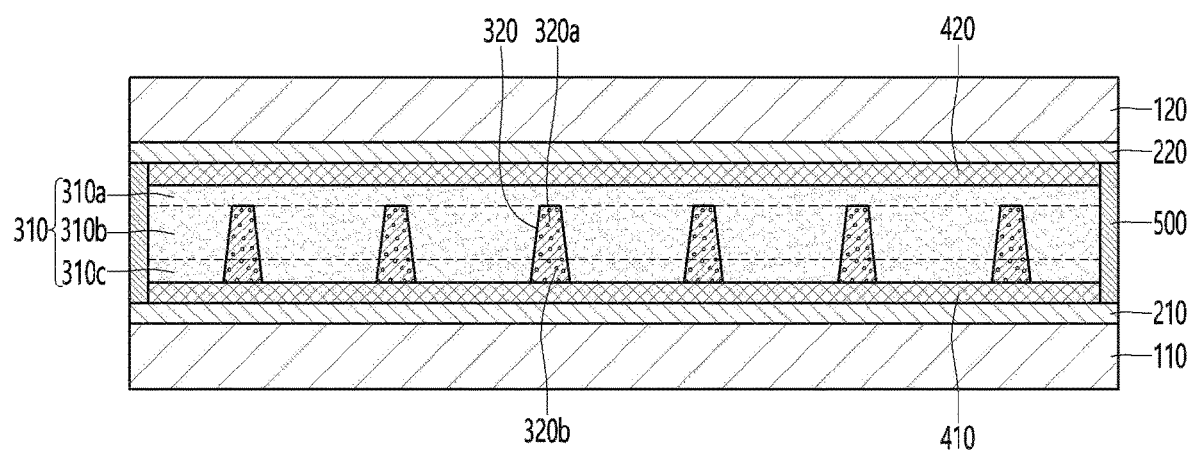

Meanwhile, referring to FIGS. 11 and 12, the partition wall part 310 may be defined as a first partition wall part 310a, a second partition wall part 310b, and a third partition wall part 310c according to positions.

For example, the first partition wall part 310a may be defined as a region between the second electrode 220 and the receiving part 320. That is, the first partition wall part 310a may be defined as a region between the lower surface of the second electrode 220 and the upper surface of the partition wall part 320 among the partition wall areas.

Also, the second partition wall part 310b and the third partition wall part 310c may be defined as a region between the first partition wall part 310a and the first electrode 210. That is, the second partition wall part 310b and the third partition wall part 310c may be defined as an area between the receiving part 320 at between the first partition wall part 310a and the first electrode 220.

The second partition wall part 310b may be defined as an area close to the first partition wall part 310a at an area between receiving part, and the third partition wall part 310c may be defined as an area close to the first electrode 210 at an area between receiving part.

In addition, the first partition wall part 310a, the second partition wall part 310b, and the third partition wall part 310c may be defined as relative positions with the first electrode 210 and the second electrode 220.

In detail, the first partition wall part 310a may be defined as a partition wall part disposed closer to the second electrode 220 than the first electrode 210, the second partition wall part 310b and the third partition wall part 310c may be defined as partition wall parts disposed closer to the first electrode 210 than the second electrode 220, and the third partition wall part 310c may be defined as a partition wall part disposed closer to the first electrode 210 than the second partition wall part.

For example, the first partition wall part 310a may be a base partition wall part disposed close to the second electrode, and the second partition wall part 310b and the third partition wall part 310c may be separation partition walls disposed close to the first electrode.

In the region between the receiving part s 320, the third partition wall part 310c may be disposed to have a thickness of 1% to 20% of the thickness of the region between the receiving parts.

When the third partition wall part 310c is formed to a thickness of less than 1% of the thickness of the region between the receiving parts, a sufficient amount of the antistatic agent may not be disposed inside the third partition wall part 310c, so that the surface resistance of the third partition wall part 310c may increase. In addition, when the third partition wall part 310c is formed to a thickness of more than 20% of the thickness of the region between the receiving parts, the surface resistance between the receiving pars is reduced by the antistatic agent, so that a leakage current in the direction of the receiving part may be increased.

The first partition wall part 310a, the second partition wall part 310b, and the third partition wall part 310c may have different resistances. In detail, the first partition wall part 310a, the second partition wall part 310b, and the third partition wall part 310c may have different volume resistances and different surface resistances.

For example, the first partition wall part 310a, the third partition wall part 310c, and the second partition wall part 310b may have different surface resistances. In detail, the first partition wall part 310a and the third partition wall part 310c may have a lower surface resistance than the second partition wall part 310b.

For example, by varying the content of the antistatic agent included in the partition wall part for each location, the surface resistance of the first partition wall part 310a, the third partition wall portion 310c, and the second partition wall portion 310b may be control.

In detail, the content of the antistatic agent included in the partition wall part may be greater in the first partition wall part 310a and the third partition wall part 310c than in the second partition wall part 310b. Accordingly, the surface resistance effect of the antistatic agent may be increased in the first partition wall portion 310a and the third partition wall portion 310c.

Accordingly, the surface resistance of the first partition wall part 310a and the third partition wall part 310c is reduced. Accordingly, the resistance between the first electrode 210 and the second electrode 220 is reduced. Accordingly, a potential difference between the first electrode 210 and the second electrode 220 may be realized with a low driving voltage.

Also, the first partition wall part 310a, the third partition wall part 310c, and the second partition wall part 310b may have different volume resistances. In detail, the second partition wall part 310b may have a higher volume resistance than the first partition wall part 310a and the third partition wall part 310c.

Alternatively, the first partition wall part 310a, the third partition wall part 310c, and the second partition wall part 310b may have the same or similar volume resistance.

That is, the first partition wall portion 310a, the third partition wall portion 310c, and the second partition wall portion 310b may have the same or different resistances in a volume resistance range of $10^{15}$ Ω·cm to $10^{19}$ Ω·cm.

Accordingly, the volume resistance of the partition wall part between the receiving parts is increased. Thereby, the leakage current that moves from the receiving parts in the direction of the partition wall part is reduced. Thereby, the driving efficiency of the light route control member can be improved.

Hereinafter, referring to FIGS. 13 to 17, a display device and a display apparatus to which the light route control member according to an embodiment is applied will be described.

Figure 13:
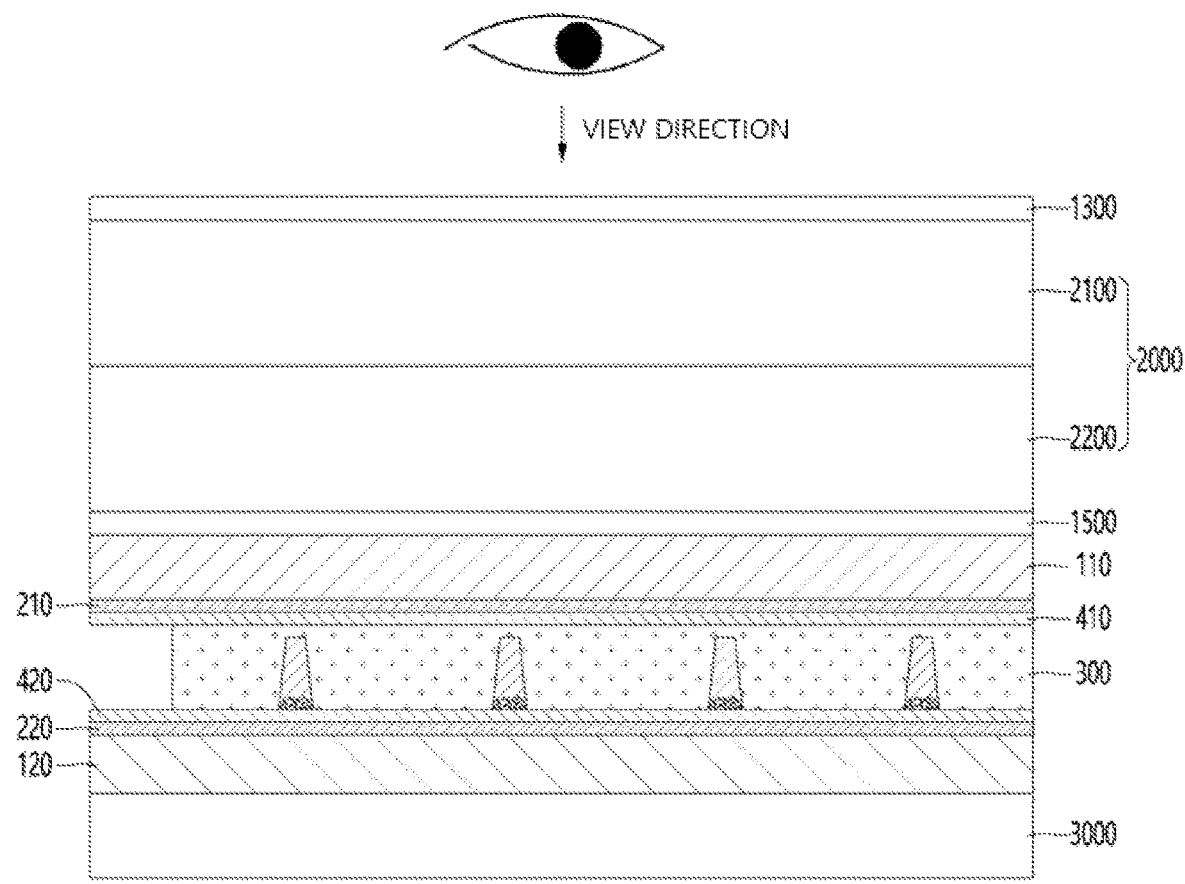
FIGS. 13 and 14 are views showing cross-sectional views of a display device to which a light route control member according to an embodiment is applied.
Figure 14:
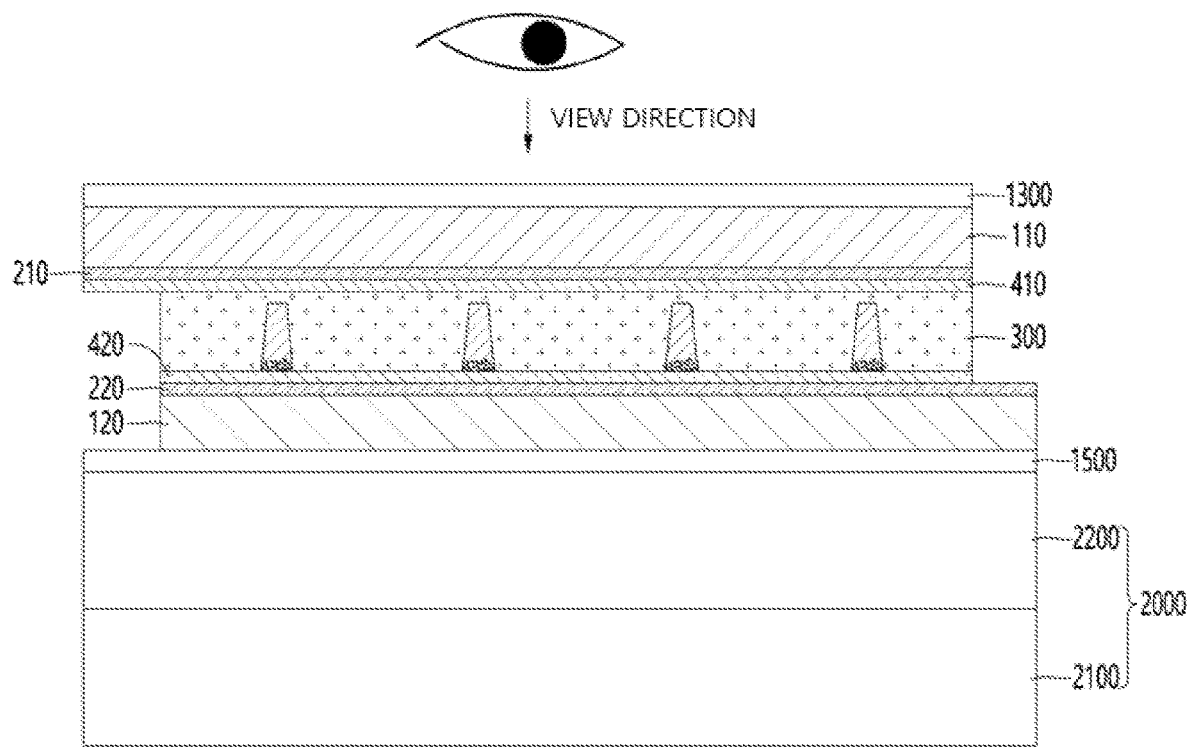

Referring to FIGS. 13 and 14, the light route control member 1000 according to an embodiment may be disposed on or under display panel 2000.

The display panel 2000 and the light route control member 1000 may be disposed to be adhered to each other. For example, the display panel 2000 and the light route control member 1000 may be adhered to each other via an adhesive layer 1500. The adhesive layer 1500 may be transparent. For example, the adhesive layer 1500 may include an adhesive or an adhesive layer containing an optical transparent adhesive material.

The adhesive layer 1500 may include a release film. In detail, when adhering the light route control member and the display panel, the light route control member and the display panel may be adhered after the release film is removed.

Meanwhile, referring to FIGS. 13 and 14, one end or one end and the other end of the light route control member may protrude, and the light conversion part may not be disposed on the protruding portion. The protrusion region is an electrode connection portion, and may connect an external printed circuit board and the light route control member through the electrode connection portion.

The display panel 2000 may include a first substrate 2100 and a second substrate 2200. When the display panel 2000 is a liquid crystal display panel, the light route control member may be formed under the liquid crystal panel. That is, when the user-viewed side of the liquid crystal panel is defined as the upper portion of the liquid crystal panel, the light route control member may be disposed under the liquid crystal panel. The display panel 2000 may be formed in a structure in which the first substrate 2100 including a thin film transistor (TFT) and a pixel electrode and the second substrate 2200 including color filter layers are bonded with a liquid crystal layer interposed therebetween.

In addition, the display panel 2000 may be a liquid crystal display panel of a color filter on transistor (COT) structure in which a thin film transistor, a color filter, and a black matrix are formed at the first substrate 2100 and the second substrate 2200 is bonded to the first substrate 2100 with the liquid crystal layer interposed therebetween. That is, a thin film transistor may be formed on the first substrate 2100, a protective film may be formed on the thin film transistor, and a color filter layer may be formed on the protective film. In addition, a pixel electrode in contact with the thin film transistor may be formed on the first substrate 2100. At this point, in order to improve an aperture ratio and simplify a masking process, the black matrix may be omitted, and a common electrode may be formed to function as the black matrix.

In addition, when the display panel 2000 is the liquid crystal display panel, the display device may further include a backlight unit providing light from a rear surface of the display panel 2000.

That is, as shown in FIG. 13, the light route control member is disposed below the liquid crystal panel and above the backlight unit 3000, and the light route control member may be disposed between the backlight unit 3000 and the display panel 2000.

Alternatively, as shown in FIG. 14, when the display panel 2000 is an organic light emitting diode panel, the light route control member may be formed on the organic light emitting diode panel. That is, when the surface viewed by the user of the organic light emitting diode panel is defined as the upper portion of the organic light emitting diode panel, the light route control member may be disposed on the organic light emitting diode panel. the display panel 2000 may include a self-luminous element that does not require a separate light source. In the display panel 2000, a thin film transistor may be formed on the first substrate 2100, and an organic light emitting element in contact with the thin film transistor may be formed. The organic light emitting element may include an anode, a cathode, and an organic light emitting layer formed between the anode and the cathode. Further, the second substrate 2200 configured to function as an encapsulation substrate for encapsulation may further be included on the organic light emitting element.

That is, the light emitted from the display panel 2000 or the backlight unit 3000 may move from the second substrate 120 of the light route control member to the first substrate 110.

Furthermore, although not shown in drawings, a polarizing plate may be further disposed between the light route control member 1000 and the display panel 2000. The polarizing plate may be a linear polarizing plate or an external light reflection preventive polarizing plate. For example, when the display panel 2000 is a liquid crystal display panel, the polarizing plate may be the linear polarizing plate. Further, when the display panel 2000 is the organic light emitting display panel, the polarizing plate may be the external light reflection preventive polarizing plate.

In addition, an additional functional layer 1300 such as an anti-reflection layer, an anti-glare, or the like may be further disposed on the light route control member 1000. Specifically, the functional layer 1300 may be adhered to one surface of first substrate 110 of the light route control member. Although not shown in drawings, the functional layer 1300 may be adhered to the first substrate 110 of the light route control member via an adhesive layer. In addition, a release film for protecting the functional layer may be further disposed on the functional layer 1300.

Further, a touch panel may be further disposed between the display panel and the light route control member.

Although it is shown in the drawings that the light route control member is disposed at an upper portion of the display panel, but the embodiment is not limited thereto, and the light route control member may be disposed at various positions such as a position in which light is adjustable, that is, a lower portion of the display panel, between a second substrate and a first substrate of the display panel, or the like.

In addition, in the drawings, the light conversion part of the light route control member according to the embodiment is shown in a direction parallel or perpendicular to the outer surface of the second substrate, but the light conversion part may be formed to be inclined at a predetermined angle from the outer surface of the second substrate. Accordingly, a moire phenomenon occurring between the display panel and the light route control member may be reduced.

Figure 16:
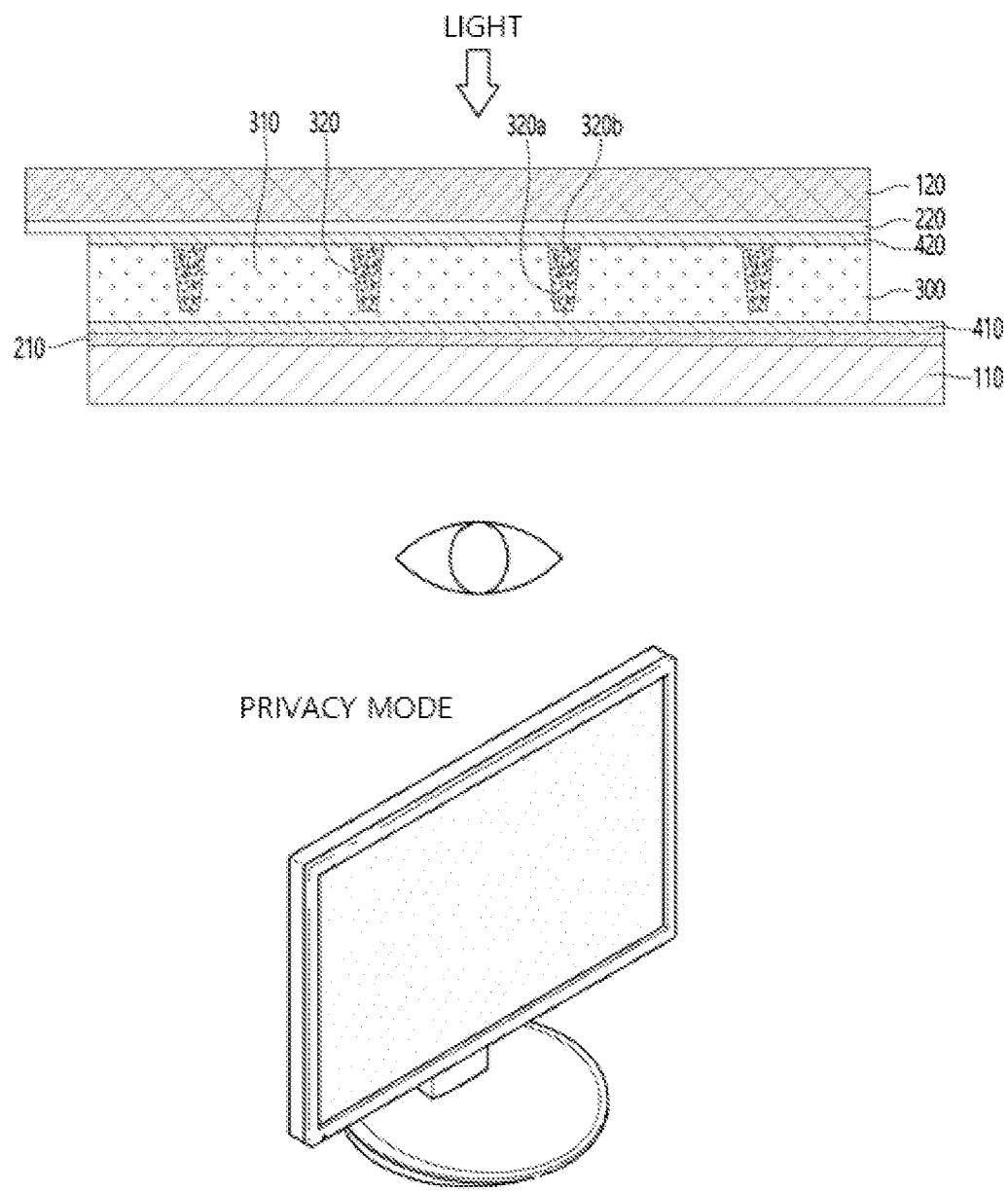
Figure 17:

Referring to FIGS. 15 to 17, the light route control member according to the embodiment may be applied to various display devices.

Referring to FIGS. 15 to 17, the light route control member according to the embodiment may be applied to a display device that displays a display.

For example, when power is not applied to the light route control member as shown in FIG. 15, the receiving unit functions as the light blocking part, so that the display device is driven in a light blocking mode, and when power is applied to the light route control member as shown in FIG. 16, the receiving unit functions as the light transmitting part, so that the display device may be driven in an open mode.

Accordingly, a user may easily drive the display device in a privacy mode or a normal mode according to application of power.

The light emitted from the backlight unit or the self-luminous device may move from the first substrate to the second substrate. Alternatively, the light emitted from the backlight unit or the self-luminous device may also move from the second substrate to the first substrate.

In addition, referring to FIG. 17, the display device to which the light route control member according to the embodiment is applied may also be applied inside the vehicle.

For example, the display device including the light route control member according to the embodiment may display a video confirming information of the vehicle and a movement route of the vehicle. The display device may be disposed between a driver seat and a passenger seat of the vehicle.

In addition, the light route control member according to the embodiment may be applied to a dashboard that displays a speed, an engine, an alarm signal, and the like of the vehicle.

Furthermore, the light route control member according to the embodiment may be applied to a front glass (FG) of the vehicle or right and left window glasses.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. A light route control member comprising:
a first substrate;
a first electrode disposed on the first substrate;
a second substrate disposed on the first substrate;
a second electrode disposed under the second substrate; and
a light conversion part disposed between the first electrode and the second electrode,
wherein the light conversion part includes a partition wall part and a receiving part that are alternately arranged,
wherein light emitted from the light source in a direction of the first substrate and the second substrate is transmitted,
wherein the light moves from the first substrate to the second substrate,
wherein a light transmittance is changed according to an application of voltage to the receiving part,
wherein the receiving part includes a dispersion and light conversion particles dispersed in the dispersion,
wherein a contact surface of the partition wall part and the receiving part has an inclination angle with respect to a reference axis in a direction perpendicular to an upper surface of the first substrate,
wherein the inclination angle is 1° to 10°,
wherein the contact surface is inclined to increase a width of the partition wall part while extending in a moving direction of the light,
wherein the contact surface is inclined to decrease a width of the receiving part while extending in the moving direction of the light, and
wherein the partition wall part includes 0.01 wt % to 10 wt % of an antistatic agent.

2. The light route control member of claim 1, wherein a refractive index of the partition wall part and a refractive index of the receiving part are different from each other.

3. The light route control member of claim 1, wherein the partition wall part has a refractive index of 1.36 to 1.64, wherein the receiving part has a refractive index of 1.42 to 1.45,
wherein the refraction index of the partition wall part is greater than the refractive index of the receiving part within the above range.

4. The light route control member of claim 1, wherein a maximum width of the receiving part is 10% to 40% of the sum of the widths of the receiving part and the partition wall part,
wherein a maximum width of the partition wall part is 60% to 90% of the sum of the widths of the receiving part and the partition wall part.

5. The light route control member of claim 1, wherein an incident angle of a first light moving in a direction from the partition wall part toward the receiving part and an incident angle of a second light moving in a direction from the receiving part toward the partition wall part are different.

6. The light route control member of claim 5, wherein the incident angle of the second light is greater than the incident angle of the first light.

7. The light route control member of claim 1, wherein a width of a lower surface of the partition wall part and a width of a lower surface of the receiving part are different.

8. The light route control member of claim 1, wherein the partition wall part includes a first partition wall part defined as a region between the second electrode and the receiving part and a second partition wall part defined as a region between a plurality of receiving parts, and
wherein a surface resistance of the first partition wall part is smaller than a surface resistance of the second partition wall part.

9. The light route control member of claim 1, wherein the antistatic agent is disposed on the surface of the partition wall part.

10. The light route control member of claim 1, wherein a surface resistance of the partition wall part is $10^5$ Ω/sq to $10^{12}$ Ω/sq.

11. The light route control member of claim 1, wherein a volume resistance of the partition wall part is $10^5$ Ω·cm to $10^{10}$ Ω·cm.

12. The light route control member of claim 1, wherein the partition wall part includes a first partition wall part defined as a region between the second electrode; and the receiving part and a second partition wall part and a third partition wall part defined as a region between a plurality of receiving parts,
wherein the second partition wall part is close to the first partition wall part, and the third partition wall part is close to the first electrode;
wherein the first partition wall part and the third partition wall part have a smaller surface resistance than that of the second partition wall part, and
wherein the second partition wall part has a greater volume resistance than that of the first partition wall part and the third partition wall part.

13. A display device comprising:
a display panel; and
a light route control member disposed on the display panel,
wherein the light route control member includes:
a first substrate;
a first electrode disposed on the first substrate;
a second substrate disposed on the first substrate;
a second electrode disposed under the second substrate; and
a light conversion part disposed between the first electrode and the second electrode,
wherein the light conversion part includes a partition wall part and a receiving part that are alternately arranged, wherein light emitted from the light source in a direction of the first substrate and the second substrate is transmitted, wherein the light moves from the first substrate to the second substrate, wherein a light transmittance is changed according to an application of voltage to the receiving part, wherein the receiving part includes a dispersion and light conversion particles dispersed in the dispersion, wherein a contact surface of the partition wall part and the receiving part has an inclination angle with respect to a reference axis in a direction perpendicular to the upper surface of the first substrate, wherein the inclination angle is 1° to 10°, wherein the contact surface is inclined to increase a width of the partition wall part while extending in a moving direction of the light, wherein the contact surface is inclined to decrease a width of the receiving part while extending in the moving direction of the light, and wherein the partition wall part includes 0.01 wt % to 10 wt % of an antistatic agent.

14. A light route control member comprising:
a first substrate;
a first electrode disposed on the first substrate;
a second substrate disposed on the first substrate;
a second electrode disposed under the second substrate; and
a light conversion part disposed between the first electrode and the second electrode,
wherein the light conversion part includes a partition wall part and a receiving part that are alternately arranged, wherein light emitted from the light source in a direction of the first substrate and the second substrate is transmitted, wherein the light moves from the first substrate to the second substrate, wherein a light transmittance is changed according to an application of voltage to the receiving part, wherein the receiving part includes a dispersion and light conversion particles dispersed in the dispersion, wherein a contact surface of the partition wall part and the receiving part has an inclination angle with respect to a reference axis in a direction perpendicular to an upper surface of the first substrate, wherein the inclination angle is 1° to 10°, wherein the contact surface is inclined to increase a width of the partition wall part while extending in a moving direction of the light, wherein the contact surface is inclined to decrease a width of the receiving part while extending in the moving direction of the light, wherein the partition wall part includes a first partition wall part defined as a region between the second electrode and the receiving part and a second partition wall part defined as a region between a plurality of receiving parts, and wherein a surface resistance of the first partition wall part is smaller than a surface resistance of the second partition wall part.

15. The light route control member of claim 14, wherein a volume resistance of the second partition wall part is greater than a volume resistance of the first partition wall part.

* * * * *